United States Patent
Almeida et al.

(10) Patent No.: US 11,936,628 B1
(45) Date of Patent: *Mar. 19, 2024

(54) SYNTHETIC AND VARIABLE DEVICE IDENTIFICATIONS

(71) Applicant: CSC Holdings, LLC, Bethpage, NY (US)

(72) Inventors: Heitor J. Almeida, Elmsford, NY (US); Jaison Antony, Dix Hills, NY (US); John Markowski, Smithtown, NY (US); Peter Caramanica, Westbury, NY (US)

(73) Assignee: CSC Holdings, LLC, Bethpage, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 17/509,452

(22) Filed: Oct. 25, 2021

Related U.S. Application Data

(63) Continuation of application No. 16/109,064, filed on Aug. 22, 2018, now Pat. No. 11,159,491.

(51) Int. Cl.
*H04L 29/06* (2006.01)
*H04L 9/40* (2022.01)

(52) U.S. Cl.
CPC ...... *H04L 63/0421* (2013.01); *H04L 63/0876* (2013.01); *H04L 63/126* (2013.01); *H04L 63/168* (2013.01)

(58) Field of Classification Search
CPC ............ H04L 63/0421; H04L 63/0876; H04L 63/126; H04L 63/168
See application file for complete search history.

(56) References Cited

U.S. PATENT DOCUMENTS

| | | |
|---|---|---|
| 2007/0136821 A1 | 6/2007 | Hershaft et al. |
| 2013/0325599 A1 | 12/2013 | Yeri et al. |
| 2016/0127892 A1 | 5/2016 | Huang et al. |
| 2016/0149894 A1* | 5/2016 | Jneid ................... H04L 63/0876 726/7 |
| 2016/0359632 A1* | 12/2016 | Mohajeri ............... H04W 12/02 |
| 2018/0131571 A1* | 5/2018 | Ansari .................... G06F 16/64 |

* cited by examiner

*Primary Examiner* — Evans Desrosiers
(74) *Attorney, Agent, or Firm* — Sterne, Kessler, Goldstein & Fox P.L.L.C.

(57) ABSTRACT

A method, system, and computer program product to provide a synthetic device ID for a device is provided herein. The method includes receiving a request from the device to obtain a service from a vendor, where the device is associated with an internal device ID. The method further includes generating the synthetic device ID for the device and associating the device, the internal device ID, the vendor, and the synthetic device ID. The method also includes transmitting the synthetic device ID to the vendor, and internally tracking the request based on the association.

22 Claims, 5 Drawing Sheets

SYNTHETIC AND VARIABLE DEVICE IDENTIFICATIONS

CROSS REFERENCE TO RELATED APPLICATIONS

The present application is a continuation of U.S. patent application Ser. No. 16/109,064, filed on Aug. 22, 2018, now U.S. Pat. No. 11,159,491, which is incorporated herein by reference in its entirety.

BACKGROUND OF THE DISCLOSURE

Vendors that provide services such as digital video, voice-to-text, or Internet ("web") search requests, typically track devices requesting the services to build a usage profile for the devices or a user using the devices. An identifier (ID) associated with a device or a user of the device is usually used by the vendors to track the usage of the device. The usage profile tracks the user and their preferences.

BRIEF DESCRIPTION OF THE DRAWINGS/FIGURES

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 1 illustrates an example system according to an embodiment of the disclosure.

FIG. 2 further illustrates a synthetic device ID generator according to an embodiment of the disclosure.

The present disclosure will now be described with reference to the accompanying drawings. In the drawings, like reference numbers may indicate identical or functionally similar elements

DETAILED DESCRIPTION OF THE DISCLOSURE

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For the purposes of this discussion, the term "processor" or "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor. The systems and devices described herein may each include processor or processor circuitry to implement the embodiments presented herein.

Figure 1:
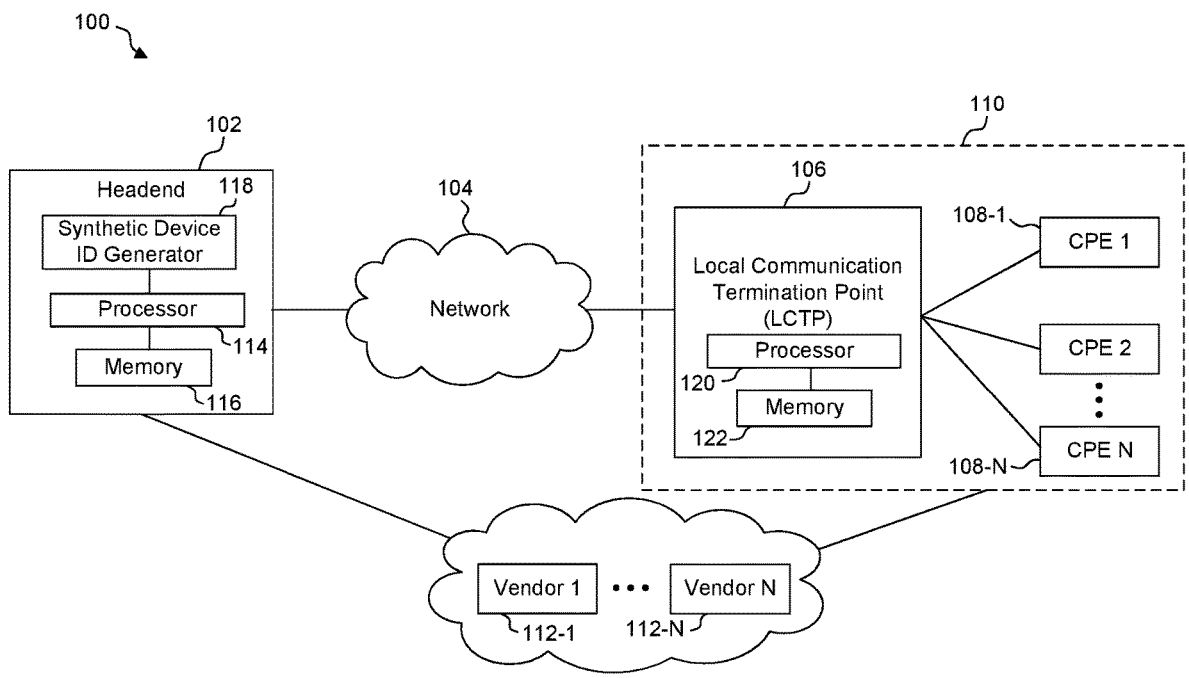

FIG. 1 illustrates an example system 100 according to an embodiment of the disclosure System 100 includes a headend 102 coupled to devices 110 via a network 104. Devices 110 include a local communication termination point ("LCTP") 106 that is coupled to customer premise equipment ("CPE") 108-1 to 108-N ("CPE 108"). A "device 110" as referred to herein may be any of a CPE 108 or LCTP 106. In an example, headend 102 is a cable modem termination system ("CMTS") or a backend system. In an example, LCTP 106 is a set-top box. CPE devices 108-1 to 108-N may be any type of electronic device that is capable of wired or wireless connection such as a cell phone, a laptop, a computer, or a smart television. In an example, headend 102 and/or devices 110 are in communication with vendors 112-1 to 112-N ("vendor 112"). Headend 102 includes a synthetic device ID generator 118 coupled to a processor 114. Processor 114 is coupled to a memory 116. Local communication termination point 106 includes a processor 120 coupled to a memory 122. Each CPE 108 includes a processor coupled to a memory (not shown). Synthetic device ID generator 118 will be described in further detail with respect to FIG. 2 below.

Vendors 112-1 to 112-N may be any type of service provider such as, for example a digital video service provider such as Netflix™ or YouTube™, a cable television provider, a website or search engine such as Google™. In an example, the service provided by vendors 112 is a voice-to-text translation where audio is sent to the vendor and the vendor converts the audio into text in order to perform a search using the translated text. For example, a user of a CPE 108, e.g. a digital television streaming box such as Apple TV™, may use a remote control coupled to the CPE 108 to request a voice search for "action movies" from a vendor 112, e.g. Netflix™. The request may be sent either directly or via headend 102 to vendor 112. The vendor 112 receives the request in audio format, converts it to text, performs a search for action movies, and returns the results either via headend 102 or directly to the CPE 108. In another example, a vendor 112 might be a service provider that provides an electronic program guide for cable television channels. In a further example, vendor 112 may be a search engine or a website. It is to be appreciated that a vendor 112 may be any type of service provider that can provide any type of service. In an example, vendors 112 may be referred to as "service providers" herein.

A vendor 112 requests a device identifier (ID) associated with a device 110 (such as a CPE 108 or LCTP 106) when providing a service to a device 110. In an example, each device 110 is associated with an internal device ID that is unique. The internal device ID may be an ID that is assigned by headend 102. In another example, the internal device ID may be the Media Access Control (MAC) ID, a device serial number, or an IP address. It is to be appreciated that the device ID may be any ID that is unique to a device 110. A vendor 112 may track the activities of a user of a device 110 based on the internal device ID. For example, if a user of a device 110 requests a voice-to-text search for an action movie as in the example above, the vendor 112 providing the service might track the user's preference for action movies based on the search request. By tracking a usage of a device 110 a vendor 112 may be able to create a profile of the user's preferences and exploit the data collected regarding the preferences for either providing targeted advertising, targeted suggestions for further services, financial, or malicious gain. In an example, a user profile generated by a vendor may be sold to a third-party thereby violating the privacy of a user of a device 110. In another example, a vendor 112 that is collecting data regarding the usage and preferences of a user may be hacked by a malicious third-party that may steal the user's profile and utilize the profile for unauthorized use. Therefore, it is an object of the embodiments presented herein to prevent vendors 112 from tracking usage of devices 110. The embodiments presented herein provide a synthetic and variable device ID to third party vendors 112 for each device 110. As will be further described below, synthetic and variable device IDs are generated so that each ID is unique, and has no correlation to an actual device ID of a device 110. The lack of correlation prevents a vendor 112 from correlating the synthetic device ID with an actual device ID of a device 110 and determining an identity of the device 110 or that of a user of device 110. Furthermore, in embodiments presented herein, each vendor 112 receives a different and unique synthetic device ID for a particular device 110 so that vendors 112 cannot communicate between themselves in order to correlate device IDs and thereby track usage of a device 110. In addition, a device ID for a particular device 110 may be changed periodically, conditionally, or arbitrarily by headend 102.

In an example, vendors 112 may either communicate directly with devices 110 or via headend 102. For example, when a device 110 requests a service from a vendor 112, the request may be transmitted to headend 102. Headend 102 then sends the request onto vendor 112 along with a device ID associated with the device 110. In another example, a device 110 may communicate directly with a vendor 112. For example, a device 110 may communicate directly with a vendor 112 to request a service. The embodiments presented herein provide a synthetic device ID for both cases when either a device 110 is requesting a service indirectly via headend 102 or when a device 110 is requesting a service directly from a vendor 112.

Figure 2:
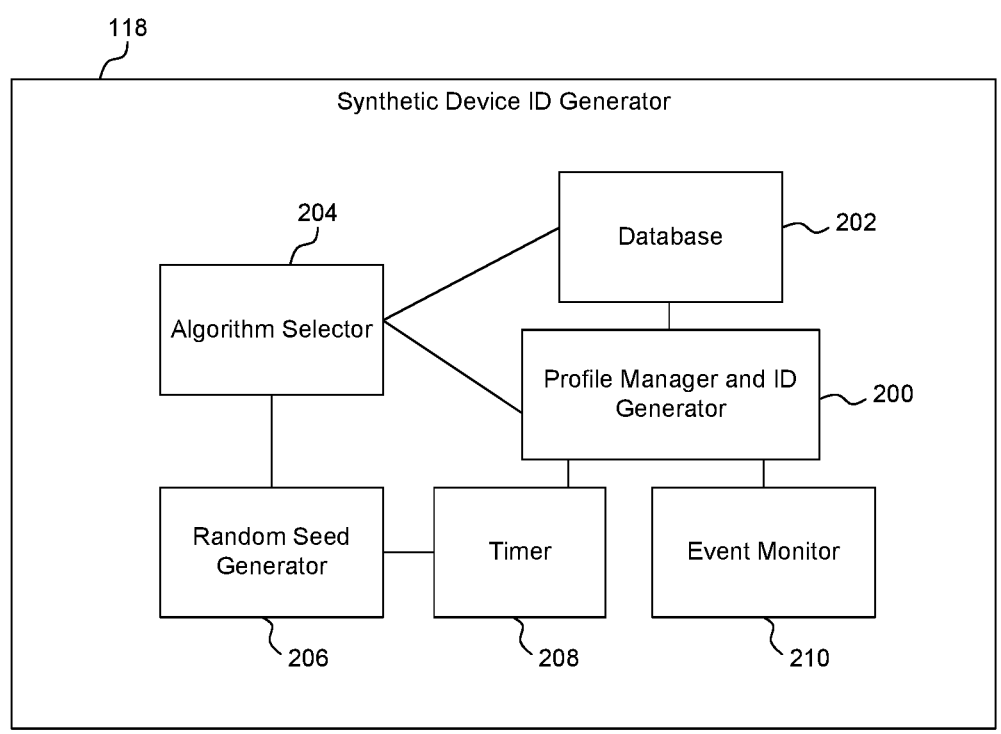

FIG. 2 further illustrates synthetic device ID generator 118 according to an embodiment of the disclosure. Synthetic device ID generator 118 generates, updates, and manages synthetic device IDs for devices 110 as will be described further below. Synthetic device ID generator 118 includes a profile manager and ID generator 200 coupled to an algorithm selector 204, a database 202, an event monitor 210, a timer 208, and a random seed generator 206. Profile manager and ID generator 200 may use a table to associate a device ID, an internal or "actual" device ID for the device 110, vendors 112, and synthetic device IDs associated with the vendors 112 for a particular device 110. Table 1 below illustrates such as association.

TABLE 1

| Device | Internal Device ID | Vendor 112-1 | Vendor 112-2 | ... | Vendor 112-N |
|---|---|---|---|---|---|
| CPE 108-1 | Device 1 | ABC | DEF | | XYZ |
| CPE 108-2 | Device 2 | 123 | 456 | | 789 |
| ... | ... | | | | |
| CPE 108-N LCTP 106 | Device N STB 1 | ... A12 | ... B12 | ... | ... Z12 |

As shown in Table 1, a device such as CPE 108-1 may have an internal device ID "Device 1." However, for a vendor 112-1 a synthetic device ID such as "ABC" might be used. Similarly, for a vendor 112-2, the synthetic device ID associated with device 108-1 may be "DEF." In this manner, profile manager and ID generator 200 creates a set of synthetic device IDs for each device 110 and stores the association between a vendor 112, the internal device ID, the device, and the synthetic device ID in Table 1. Table 1 may be stored in a database such as a database 202 or in memory 116. When the requested service is received from the vendor it includes the synthetic device ID that was sent to the vendor. Using table 1, headend 102 internally tracks the request based on the association of the synthetic device ID and the device in Table 1. For example, when vendor 112-1 returns the results of a request along with synthetic device ID "ABC," headend 102 uses table 1 to determine that CPE 108-1 associated with internal ID "Device 1" is where the results are to be forwarded.

In an example, profile manager and ID generator 200 transmits a profile to each device 110. The profile includes, for example, the synthetic device IDs that a particular device 110 is to use for each corresponding vendor 110. For example, a profile including table 2 below may be transmitted to CPE 108-1. CPE 108-1 uses a synthetic device ID corresponding to a particular vendor 112 when communicating with the vendor 112. For example, CPE 108-1 will send the synthetic device ID "DEF" when communicating with vendor 112-2.

TABLE 2

| Device | Internal Device ID | Vendor 112-1 | Vendor 112-2 | ... | Vendor 112-N |
|---|---|---|---|---|---|
| CPE 108-1 | Device 1 | ABC | DEF | | XYZ |

In an example, a device 110 sends the request for a service from a vendor 112 via headend 102. In this case, headend 102 sends the synthetic device ID corresponding to the vendor 112 based on Table 1 along with the request. For example, if CPE 108-1 requests a service from a vendor 112-1 via headend 102, profile manager and ID generator 200 sends the synthetic device ID "ABC" to vendor 112-1 along with the request. If CPE 108-1 is requesting service directly from vendor 112-1, then CPE 1081-1 sends the synthetic device ID "ABC" to vendor 112-1 based on table 2 along with the request.

In an example, profile manager and ID generator 200 updates one or more synthetic device IDs for one or more devices 110 based on a signal received from timer 208. For example, timer 208 may periodically send a signal to profile manager and ID generator 200 to update the synthetic device IDs associated with one or more vendors 112 or one or more devices 110. Profile manager and ID generator 200 may use algorithm selector 204 that selects an algorithm from a set of distinct algorithms stored in database 202 to generate synthetic device IDs. Algorithm selector 204 may use different algorithms for each device 110 or vendor 112. In another example, a random seed generator 206 may be coupled to algorithm selector 204 that randomizes the algorithm selected by algorithm selector 204 for generating synthetic device IDs. The synthetic device ID is generated by profile manager and ID generator 200 based on the algorithm selected by the algorithm selector 204. In an example, event monitor 210 sends a signal to profile manager and ID generator 200 to generate synthetic device IDs for one or more devices 110 or one or more vendors 112. For example, if there has been a security breach either at the headend 202 or at a particular vendor 112, event monitor 210 may send a signal to profile manager and ID generator 200 to update the synthetic device IDs for the device 110 or the vendor 112 that experienced the breach. Profile manager and ID generator 200 may send updated profiles to devices 110 upon an update of the synthetic device IDs. In another example, a device 110 may send a request to a headend 102 for an updated profile with updated synthetic device IDs for a particular vendor 112 each time a request for a service is sent that vendor 112. For example, when requesting a service such as a search from a particular vendor 112, a CPE 108 may send a request to headend 102 to generate an updated profile that has a new synthetic device ID for the vendor 112 for each such request.

Figure 3:
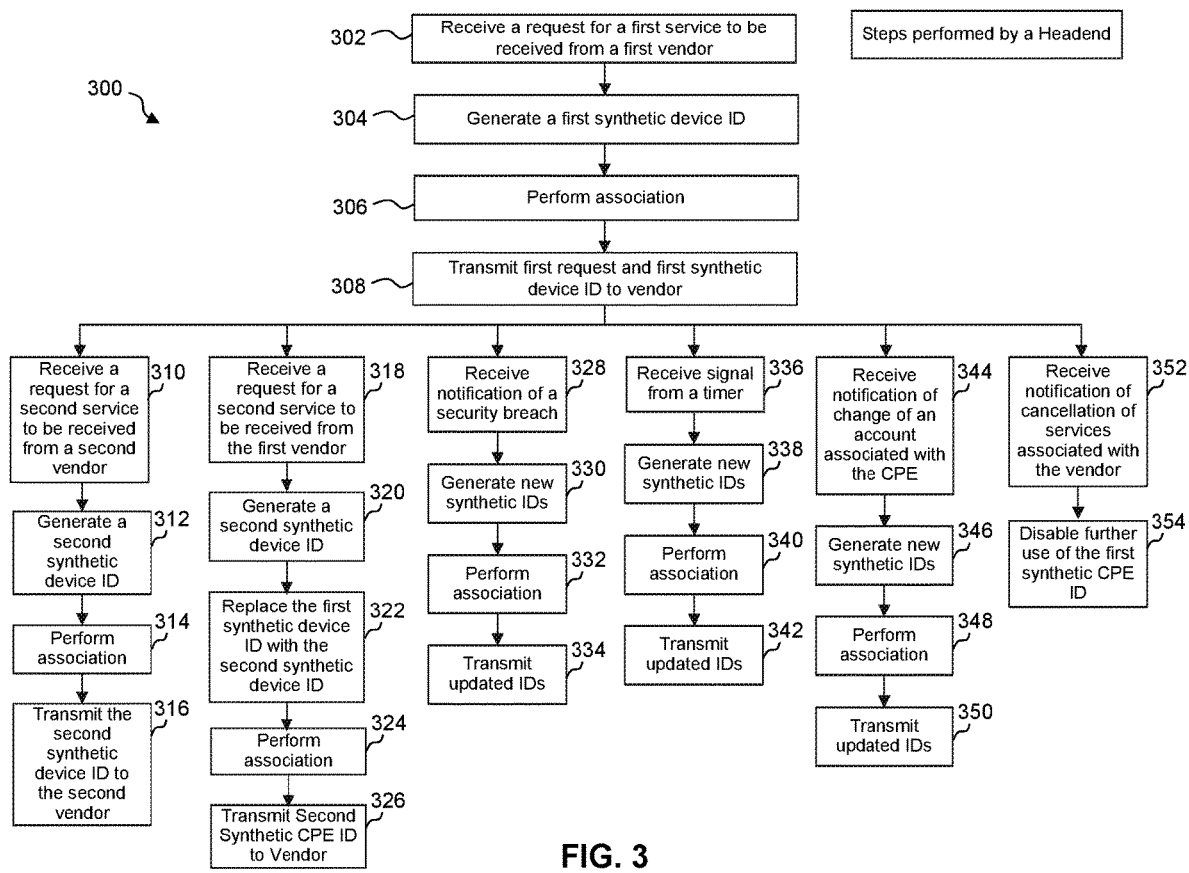
FIG. 3 illustrates an example flowchart that illustrates steps performed by a headend to generate and update synthetic device IDs according to an embodiment of the disclosure.

FIG. 3 illustrates an example flowchart 300 that illustrates steps performed by a headend 102 to generate and update synthetic device IDs according to an embodiment of the disclosure.

In step 302, a request is received for a first service from a first vendor. For example, a request for a first service, such as a voice-to-text search, from vendor 112-1 is received by headend 102 from CPE 108-1.

In step 304, a first synthetic device ID is generated. For example, profile manager and ID generator 200, based on an algorithm selected by algorithm selector 204 from database 202, generates a synthetic device ID "ABC" corresponding to vendor 112-1.

In step 306, the device, the internal device ID, the vendor, and the synthetic device ID are associated. For example, profile manager and ID generator 200 associates the internal device ID "Device 1," the synthetic device ID "ABC," CPE 108-1, and vendor 112-1 using Table 1.

In step 308, the request for the first service is transmitted along with the first synthetic device ID to the vendor. For example, headend 102 transmits the synthetic device ID "ABC" to vendor 112-1 along with the request for the service received from CPE 108-1.

In step 310, a request is received for a second service from a second vendor. For example, CPE 108-1 may request headend 102 for a service, such as a web search, from vendor 112-2.

In step 312, a second synthetic device ID is generated. For example, profile manager and ID generator 200 may generate a second synthetic device ID for CPE 108-1 that corresponds to vendor 112-2.

In step 314, the device, the internal device ID, the second vendor, and the second synthetic device ID are associated. For example, profile manager and ID generator 200 associates the internal device ID "Device 1," the synthetic device ID "DEF" with CPE 108-1 and vendor 112-2 using table 1.

In step 316, the second synthetic device ID is transmitted to the second vendor along with the second request. For example, headend 202 transmits the second request along with the second synthetic device ID "DEF" to vendor 112-2.

In step 318, a request is received for a second service from the first vendor. For example, CPE 108-1 may request a second voice-to-text search from vendor 112-1 via headend 102.

In step 320, a second synthetic device ID is generated. For example, profile manager and ID generator 200 generates a second synthetic device ID associated with vendor 112-1 to service the second request.

In step 322, the first synthetic device ID is replaced with the second synthetic device ID. For example, the first synthetic ID "ABC" is replaced with a second synthetic ID, for example, "LMK."

In step 324, the device, the internal device ID, the second vendor, and the second synthetic device ID are associated. For example, profile manager and ID generator 200 associates the internal device ID "Device 1," the second synthetic device ID "LMK," CPE 108-1, and vendor 112-1 using table 1.

In step 326, the second synthetic device ID is transmitted to the vendor. For example, the second synthetic device ID "LMK" is transmitted to the vendor 112-1 along with the second request for service.

In step 328, a notification is received of a security breach. For example, event monitor 210 may receive a notification of a security breach for a vendor 112, for a device 110, or for headend 102 and send a signal to profile manager and ID generator 200.

In step 330, new synthetic device IDs are generated for one or more devices or vendors affected by the security breach. For example, in response to receiving the signal, profile manager and ID generator 200 generates replacement synthetic device IDs for one or more vendors 112 or devices 110 affected by the breach.

In step 332, the new synthetic device IDs are associated with the corresponding devices and vendors. For example, profile manager and ID generator 200 associates the new synthetic device IDs, with respective devices 110, internal device IDs, and vendors 112 using Table 1.

In step 334, the new synthetic device IDs are transmitted to respective devices and to vendors when a request for a service from the respective vendors is received. For example, headend 102 transmits the new synthetic device IDs to respective devices 110 and to respective vendors 112 affected by the breach when a request is received for a service from the respective vendors 112.

In step 336, a signal may be received from a timer. For example, profile manager and ID generator 200 may receive a signal from timer 208.

In step 338, new synthetic device IDs may be generated for one or more devices or for one or more vendors. For example, certain devices 108 or vendors 112 may be flagged to have synthetic device IDs associated with them to replaced periodically. In response to the signal received from timer 208, profile manager and ID generator 200 generates new synthetic device IDs for one or more devices 108 or vendors 112.

In step 340, the new synthetic device IDs are associated with the corresponding devices and vendors. For example, profile manager and ID generator 200 associates the new synthetic device IDs with respective devices 110, internal device IDs, and vendors 112 using Table 1.

In step 342, the new synthetic device IDs are transmitted to respective devices and to vendors. For example, headend 102 transmits the new synthetic device IDs to respective devices 110 and to respective vendors 112 when a request is received for a service from the respective vendors 112.

In step 344, a notification of a change in an account associated with the CPE may be received. For example, profile manager and ID generator 200 may receive a signal from event monitor 210 indicating a change in an account associated with CPE 108-2.

In step 346, new synthetic device IDs are generated for each vendor associated with the device. For example, profile manager and ID generator 200 generates new synthetic device IDs for each vendor 112 associated with CPE 108-2.

In step 348, the new synthetic device IDs are associated with the corresponding devices and vendors. For example, profile manager and ID generator 200 associates CPE 108-2, the new synthetic device IDs, and corresponding vendors 112 using Table 1.

In step 350, the new synthetic device IDs are transmitted to the affected device and to vendors associated with the device when servicing a request from the device. For example, profile manager and ID generator 200 transmits the new synthetic device IDs to CPE 108-2 and to vendors 112 associated with CPE 108-2 when servicing requests from CPE 108-2.

In step 352, a notification of cancellation of services associated with a vendor is received. For example, if services are no longer provided by a vendor 112 or a vendor 112 is no longer being used, then event monitor 210 sends a message to profile manager and ID generator 200 regarding the cancellation.

In step 354, further use of the synthetic device ID associated with the vendor is terminated. For example, if services associated with vendor 112-1 are cancelled, then synthetic device IDs such as "ABC," "123," or "A12" that were associated with vendor 112-1 are not used with any other vendors 112.

Figure 4:
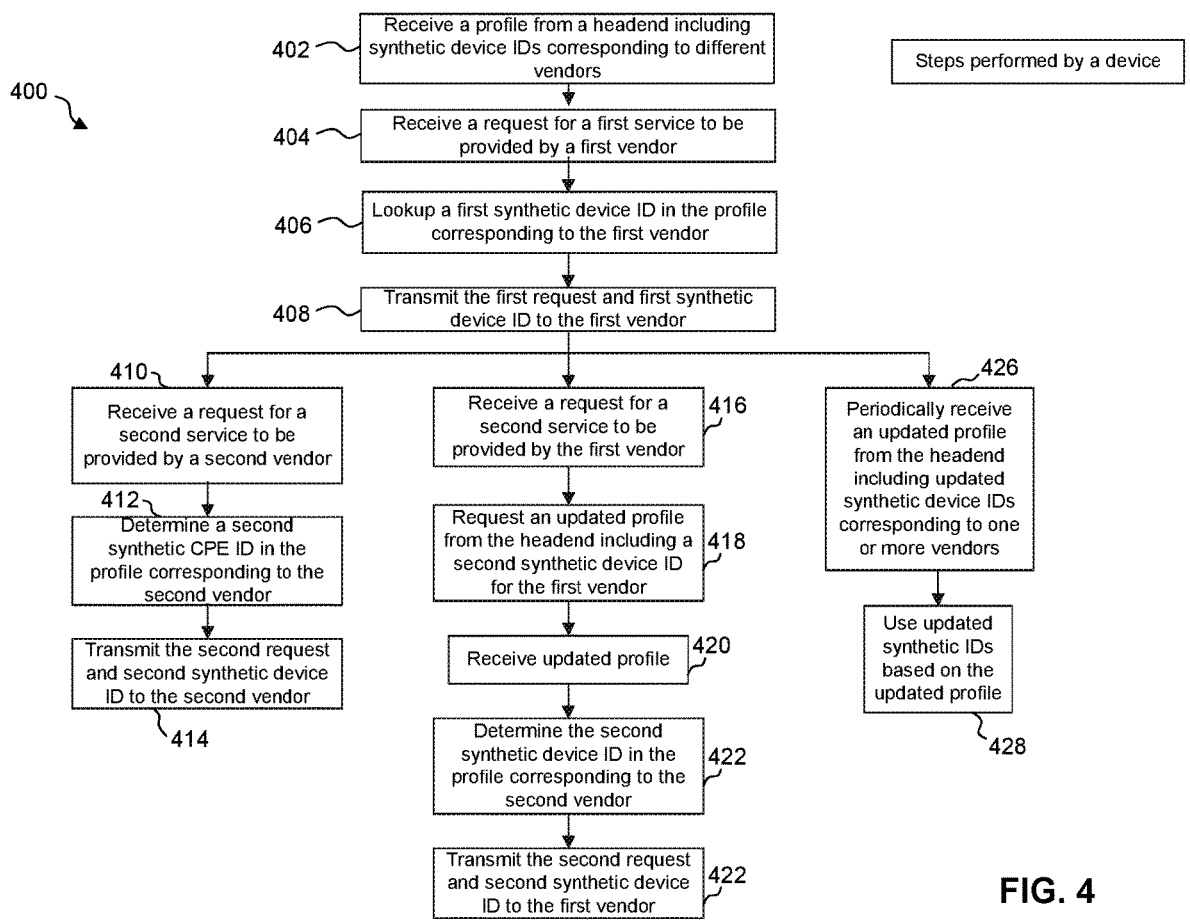
FIG. 4 illustrates an example flowchart illustrating steps performed by a device that uses synthetic device IDs according to an embodiment of the disclosure.

FIG. 4 illustrates an example flowchart 400 showing steps performed by a device 110 that uses synthetic device IDs according to an embodiment of the disclosure.

In step 402, a profile is received from a headend that includes synthetic device IDs corresponding to different vendors. For example, a device such as CPE 108-1 receives a profile that includes synthetic device IDs corresponding to different vendors as shown in Table 2.

In step 404, a first service to be provided by a first vendor is generated. For example, a device 110 may generate a request for a first service, such as a voice-to-text search request, to be provided by vendor 112-1.

In step 406, a first synthetic device ID corresponding to the first vendor is determined. For example, CPE 108-1, based on table 2 received in step 402, determines that synthetic device ID "ABC" is to be used for requests corresponding to vendor 112-1.

In step 408, the first request and the first synthetic device ID are transmitted to the first vendor. For example, CPE 108-1 transmits the request for the search to vendor 112-1 along with the synthetic device ID "ABC."

In step 410, a request is generated for a second service to be received from a second vendor. For example, CPE 108-2 may generate a request for a second service, such as web search, from vendor 112-2.

In step 412, a second synthetic device ID corresponding to the second vendor is determined based on the profile received in step 402. For example, a second synthetic device ID "DEF" corresponding to vendor 112-2 is determined from Table 2.

In step 414, the second request and the second CPE ID are transmitted to the second vendor. For example, CPE 108-1 transmits the second request to vendor 112-2 along with the second synthetic device ID "DEF."

In step 416, a request is received for a second service that is to be provided by the first vendor. For example, CPE 108-1 may request a second service such as a second voice-to-text search to be performed by the first vendor 112-1.

In step 418, in response to the second request, an updated profile may be requested from the headend including a second synthetic device ID for the first vendor. For example, CPE 108-1 may request headend 102 for a second synthetic device ID for vendor 112-1.

In step 420, an updated profile including a second synthetic device ID is received. For example, CPE 108-1 receives a new profile with a second synthetic device ID for requesting the second search from vendor 112-1.

In step 422, the second synthetic device ID corresponding to the first vendor is determined. For example, CPE 108-1 determines the second synthetic device ID corresponding to vendor 112-1 based on the updated profile received in step 420.

In step 424, the second request and the second synthetic device ID are transmitted to the first vendor. For example, CPE 108-1 transmits the second request and the second synthetic device ID to vendor 112-1.

In step 426, an updated profile including updated synthetic device IDs for one or more vendors is periodically received from the headend. For example, CPE 108-1 may periodically receive an updated profile from headend 102 including a new set of synthetic device IDs for vendors 112 in table 2.

In step 428, the updated synthetic device IDs are used based on the updated profile. For example, CPE 108-1 use the updated synthetic device IDs when requesting a service from vendors 112.

In the examples presented above, the synthetic device ID is generated by headend 102. However, it is to be appreciated by persons of skill in the art that in alternate embodiments the device IDs can be generated by each device 110. In an example, each device 110 may generate the ID and register it with the profile manager and ID generator 200.

Figure 5:
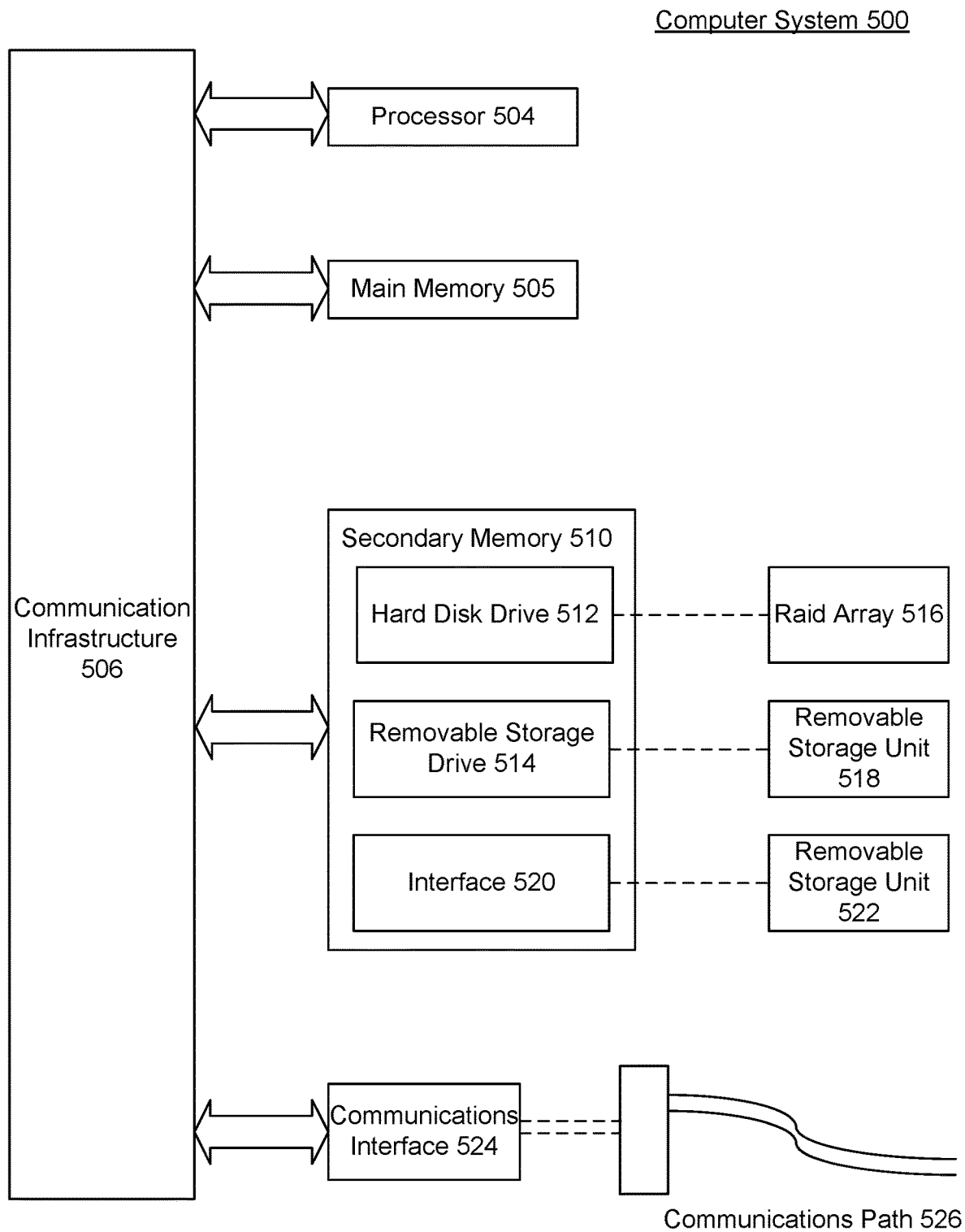
FIG. 5 illustrates an example computer system to implement embodiments disclosed herein.

The following describes a general-purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 500 is shown in FIG. 5. The computer system 500 includes one or more processors, such as processor 504. Processor 504 can be a special purpose or a general-purpose digital signal processor. Processor 504 may be, for example, any of the processors described herein. The processor 504 is connected to a communication infrastructure 506 (for example, a bus or network). Various software implementations are described in terms of this exemplary computer system. After reading this description, it will become apparent to a person skilled in the relevant art how to implement the disclosure using other computer systems and/or computer architectures.

Computer system 500 also includes a main memory 505, preferably random access memory (RAM), and may also include a secondary memory 510. The secondary memory 510 may include, for example, a hard disk drive 512, and/or a RAID array 516, and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518 represents a floppy disk, magnetic tape, optical disk, etc. As will be appreciated, the removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software (i.e., instructions) and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCM-CIA slot and card, etc., that are coupled to a communications path 526. The communications path 526 can be implemented using wire or cable, fiber optics, a phone line, a cellular phone link, an RF link and other communications links or channels.

The terms "computer program medium" and "computer usable medium" are used herein to generally refer to media such as removable storage drive 514, a hard disk installed in hard disk drive 512, or other hardware type memory. These computer program products are means for providing or storing software (e.g. instructions) to computer system 500.

Computer programs (also called computer control logic) are stored in main memory 505 and/or secondary memory 510. Computer programs may also be received via communications interface 524. Such computer programs, when executed, enable the computer system 500 to implement the present disclosure as discussed herein. In particular, the computer programs, when executed, enable the processor 504 to implement the processes and/or functions of the present disclosure. For example, when executed, the computer programs enable processor 504 to implement part of or all of the steps described herein. Where the disclosure is implemented using software, the software may be stored in a computer program product and loaded into computer system 500 using raid array 516, removable storage drive 514, hard drive 512 or communications interface 524.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The embodiments presented herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. An apparatus of a service provider network for providing a plurality of synthetic device identifications (IDs) for a device, the apparatus comprising:
   a memory that stores a table having an association between the device, an internal device ID for the device, and a plurality of synthetic device IDs for the device corresponding to a plurality of vendors, the plurality of synthetic device IDs being unique and different from one another; and
   a processor, coupled to the memory, configured to execute instructions stored in the memory, the instructions, when executed by the processor, configuring the processor to:
      receive a request from the device to obtain a service from a vendor from among the plurality of vendors;
      generate a synthetic device ID for the device that corresponds to the vendor;
      associate the device, the internal device ID, the synthetic device ID, and the vendor in the table; and
      transmit the synthetic device ID to the device to cause the device to send a request for the service to the vendor using the synthetic device ID.

2. The apparatus of claim 1, wherein the plurality of vendors comprises a plurality of service providers configured to provide a plurality of services, at least one service from among the plurality of services being a voice-to-text translation to convert audio into text.

3. The apparatus of claim 1, wherein the internal device ID comprises:
   a Media Access Control (MAC) ID of the device;
   a serial number of the device; or
   an Internet Protocol (IP) address of the device.

4. The apparatus of claim 1, wherein the instructions, when executed by the processor, further configure the processor to generate the synthetic device ID having no correlation with the internal device ID.

5. The apparatus of claim 1, wherein the instructions, when executed by the processor, further configure the processor to:
   receive a second request from the device to obtain a second service from a second vendor from among the plurality of vendors;
   generate a second synthetic device ID for the device that corresponds to the second vendor, the second synthetic device ID being different and unique from the synthetic device ID;
   associate the device, the internal device ID, the second synthetic device ID, and the second vendor in the table; and
   transmit the second synthetic device ID to the device to cause the device to request the service from the vendor using the synthetic device ID.

6. The apparatus of claim 1, wherein the instructions, when executed by the processor, further configure the processor to:
   receive an indication of a security breach;
   generate a new synthetic device ID for the device in response to receiving the indication of the security breach; and
   associate the device, the internal device ID, the new synthetic device ID, and the vendor in the table.

7. The apparatus of claim 1, wherein the instructions, when executed by the processor, further configure the processor to:
   receive a notification indicating a cancellation of the service; and
   disable further use of the synthetic device ID in response to the notification.

8. A method for providing a plurality of synthetic device identifications (IDs) for a device, the method comprising:
   receiving a request from the device to obtain a service from a vendor from among a plurality of vendors;
   retrieving a synthetic device ID for the device that corresponds to the vendor from a table, the table having an association between the device, an internal device ID for the device, and a plurality of synthetic device IDs for the device corresponding to the plurality of vendors, the plurality of synthetic device IDs being unique and different from one another; and
   transmitting the synthetic device ID to the device to cause the device to send a request for the service to the vendor using the synthetic device ID.

9. The method of claim 8, further comprising:
   generating the synthetic device ID that corresponds to the vendor; and
   associating the device, the internal device ID, the synthetic device ID, and the vendor in the table.

10. The method of claim 9, wherein the generating comprises:
    generating the synthetic device ID having no correlation with the internal device ID.

11. The method of claim 8, further comprising:
    receiving a second request from the device to obtain a second service from a second vendor from among the plurality of vendors;
    retrieving a second synthetic device ID for the device that corresponds to the second vendor from the table, the second synthetic device ID being different and unique from the synthetic device ID; and
    transmitting the second synthetic device ID to the device to cause the device to request the second service from the vendor using the second synthetic device ID.

12. The method of claim 8, further comprising:
    receiving an indication of a security breach;
    generating a new synthetic device ID for the device in response to receiving the indication of the security breach; and
    associating the device, the internal device ID, the new synthetic device ID, and the vendor in the table.

13. The method of claim 8, further comprising:
    receiving a notification indicating a cancellation of the service; and
    disabling further use of the synthetic device ID in response to the notification.

14. An apparatus for providing a plurality of synthetic device identifications (IDs) for a device, the apparatus comprising:
    a memory that stores a table having an association between the device, an internal device ID for the device, and a plurality of synthetic device IDs for the device corresponding to a plurality of vendors, the plurality of synthetic device IDs being unique and different from one another; and
    a processor, coupled to the memory, configured to execute instructions stored in the memory, the instructions, when executed by the processor, configuring the processor to:

receive a request from the device to obtain a service from a vendor from among the plurality of vendors, retrieve a synthetic device ID for the device that corresponds to the vendor from the table, and transmit the synthetic device ID to the device to cause the device to send a request for the service to the vendor using the synthetic device ID.

15. The apparatus of claim 14, wherein the instructions, when executed by the processor, further configure the processor to:

generate the synthetic device ID that corresponds to the vendor; and associate the device, the internal device ID, the synthetic device ID, and the vendor in the table.

16. The apparatus of claim 15, wherein the instructions, when executed by the processor, configure the processor to generate the synthetic device ID having no correlation with the internal device ID.

17. The apparatus of claim 14, wherein the instructions, when executed by the processor, further configure the processor to:

receive a second request from the device to obtain a second service from a second vendor from among the plurality of vendors;

retrieve a second synthetic device ID for the device that corresponds to the second vendor from the table, the second synthetic device ID being different and unique from the synthetic device ID; and transmit the second synthetic device ID to the device to cause the device to request the second service from the vendor using the second synthetic device ID.

18. The apparatus of claim 14, wherein the instructions, when executed by the processor, further configure the processor to:

receive an indication of a security breach;

generate a new synthetic device ID for the device in response to receiving the indication of the security breach; and associate the device, the internal device ID, the new synthetic device ID, and the vendor in the table.

19. The apparatus of claim 14, wherein the instructions, when executed by the processor, further configure the processor to:

receive a notification indicating a cancellation of the service; and disable further use of the synthetic device ID in response to the notification.

20. The apparatus of claim 14, wherein the instructions, when executed by the processor, configure the processor to transmit a profile having the plurality of synthetic device IDs corresponding to the plurality of vendors to the device to cause the device to send the request for the service to the vendor using the synthetic device ID that is determined from the profile.

21. The apparatus of claim 1, wherein the instructions, when executed by the processor, configure the processor to transmit a profile having the plurality of synthetic device IDs corresponding to the plurality of vendors to the device to cause the device to send the request for the service to the vendor using the synthetic device ID that is determined from the profile.

22. The method of claim 9, wherein the transmitting comprises transmitting a profile having the plurality of synthetic device IDs corresponding to the plurality of vendors to the device to cause the device to send the request for the service to the vendor using the synthetic device ID that is determined from the profile.

* * * * *